(12) United States Patent
Krist et al.

(10) Patent No.: US 7,927,578 B2
(45) Date of Patent: Apr. 19, 2011

(54) HYDROGEN SEPARATION PROCESS USING MIXED OXIDE ION/ELECTRONIC/HYDROGEN ATOM CONDUCTING MEMBRANES

(75) Inventors: Kevin Krist, Palatine, IL (US); Estela T. Ong, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 853 days.

(21) Appl. No.: 11/529,180

(22) Filed: Sep. 28, 2006

(65) Prior Publication Data
US 2007/0025909 A1    Feb. 1, 2007

Related U.S. Application Data

(63) Continuation-in-part of application No. 11/145,329, filed on Jun. 3, 2005, now abandoned.

(51) Int. Cl.
*C01B 3/24* (2006.01)
(52) U.S. Cl. ..................... 423/650; 423/644; 423/648.1; 95/45; 95/54; 95/55; 95/56
(58) Field of Classification Search .................. 423/644, 423/648.1, 650; 95/45, 54, 55, 56
See application file for complete search history.

(56) References Cited

U.S. PATENT DOCUMENTS

| | | | |
|---|---|---|---|
| 4,057,402 A | 11/1977 | Patel et al. | |
| 4,369,045 A | 1/1983 | Vorres | |
| 4,592,762 A | 6/1986 | Babu et al. | |
| 4,699,632 A | 10/1987 | Babu et al. | |
| 5,306,411 A | 4/1994 | Mazanec et al. | |
| 6,682,714 B2 | 1/2004 | Kindig et al. | |
| 2005/0031531 A1 | 2/2005 | Stein et al. | |
| 2006/0248800 A1* | 11/2006 | Miglin et al. | 48/198.7 |
| 2007/0044663 A1* | 3/2007 | Song et al. | 96/11 |

* cited by examiner

*Primary Examiner* — Jessica L Ward
*Assistant Examiner* — Paul A Wartalowicz
(74) *Attorney, Agent, or Firm* — Mark E. Fejer

(57) ABSTRACT

A method for separation of molecular hydrogen from a gaseous mixture containing the molecular hydrogen, which method employs a dense mixed oxide ion/electronic/hydrogen atom conducting membrane or separator having a feed side and a permeate side that enables two mechanisms for hydrogen separation—ambi-polar conduction and hydrogen atom conduction. In this method, at least a portion of the molecular hydrogen is converted on the feed side of the membrane to hydrogen atoms, which hydrogen atoms are conducted through the membrane to the permeate side thereof where they are converted back to molecular hydrogen. The permeate side of the membrane is contacted with steam, forming water and/or steam on the feed side of the membrane and additional molecular hydrogen on the permeate side of the separator.

9 Claims, 4 Drawing Sheets

HYDROGEN SEPARATION PROCESS USING MIXED OXIDE ION/ELECTRONIC/HYDROGEN ATOM CONDUCTING MEMBRANES

This application is a continuation-in-part of our U.S. patent application Ser. No. 11/145,329, filed 3 Jun. 2005, now abandoned.

BACKGROUND OF THE INVENTION

1. Field of the Invention

This invention relates to a method for separating molecular hydrogen from a mixture of gases comprising the molecular hydrogen. More particularly, this invention relates to a method for separating molecular hydrogen from synthesis gases derived from the gasification of solid hydrocarbon fuels, such as coal and biomass. This invention also relates to the use of dense mixed oxide ion/electronic/hydrogen atom conducting membranes for the hydrogen separation process.

2. Description of Related Art

Solid hydrocarbon fuels such as coal and biomass are converted to gaseous fuels at high temperatures by partial oxidation with air and/or steam. Exemplary of such conversions are processes taught by U.S. Pat. Nos. 4,057,402 and 4,369,045 (coal gasification) and U.S. Pat. Nos. 4,592,762 and 4,699,632 (biomass gasification). Synthesis gases produced by these processes comprise primarily hydrogen and carbon monoxide, typically with a hydrogen/CO molar ratio in the range of about 0.6 to about 6.0. Because of the abundance of solid hydrocarbon fuels, they are potentially major sources of hydrogen, particularly if cost effective means for extracting the hydrogen from the gaseous fuel products can be devised.

Gasification of solid hydrocarbon fuels is carried out at high temperatures in the range of about 600° C. to about 1400° C. Although these temperatures favor the kinetics of chemical reactions, materials selection for use in hydrogen separation is often limited to ceramics. For example, mixed proton/electron conducting ceramics can be used to selectively separate hydrogen from a mixture of gases. The mechanism of hydrogen separation using a mixed proton/electronic ceramic membrane is shown in FIG. 1. As shown therein, a hydrogen-containing gas is introduced on the feed side of the membrane. $H_2$ is dissociated on the membrane surface into protons and electrons. The protons and electrons are transported through the membrane to the opposite surface, the permeate side of the membrane, where they recombine to form $H_2$. The membrane selectivity to $H_2$ is substantially 100%. The flux is expressed as $$J_{H_2} = -\frac{RT}{4F^2L} \frac{(\sigma_{H^+})(\sigma_{el})}{(\sigma_{H^+} + \sigma_{el})} \left( \ln(p_{H_2}^f) - \ln(p_{H_2}^p) \right)$$

where R is the gas constant, F is the Faraday constant, L is the membrane thickness, $\sigma_{H^+}$ is the proton conductivity, $\sigma_{el}$ is the electronic conductivity, $p_{H_2}^f$ is the partial pressure of hydrogen on the feed side of the membrane and $P_{H_2}^p$ is the partial pressure of hydrogen on the permeate side. The term $$\frac{(\sigma_{H^+})(\sigma_{el})}{\sigma_{H^+} + \sigma_{el}} = \sigma_{amb}$$

is called ambipolar conductivity. Thus, the flux is dependent on $1/L$, T, $\sigma_{amb}$, and $(\ln(p_{H_2}^f) - \ln(p_{H_2}^p))$.

However, mixed proton/electronic conductors have a number of shortcomings including poor strength and reactivity with gasified fuel species such as $CO_2$ and $H_2S$. In addition, $H_2$ separation from the fuel gases renders the spent fuel vulnerable to carbon deposition, which can cover membrane surfaces and inactivate the membrane.

U.S. Pat. No. 5,306,411 teaches solid membranes comprising an intimate, gas impervious, multi-phase mixture of an electronically-conductive material and an oxygen-conductive material and/or a mixed metal oxide of a perovskite structure for use in electrochemical reactors in which oxygen is transported from an oxygen-containing gas to a gas or mixture of gases that consume oxygen, more particularly for partial oxidation of methane to produce unsaturated compounds or synthesis gas, the partial oxidation of ethane, substitution of aromatic compounds, extraction of oxygen from oxygen-containing gases, including oxidized gases, ammoxidation of methane, etc. The focus of the teachings of the '411 patent is the conversion of an oxygen-consuming gas, such as methane, to produce other useful gases, e.g. synthesis gas. Accordingly, in the case where methane is disposed on one side of the mixed ionic/electronic conducting membrane and air is disposed on the opposite side of the membrane, as the air contacts the membrane, the oxygen component of the air is reduced to oxygen ions which are transported through the membrane to the methane side of the membrane where the oxygen ions react with the methane to produce synthesis gas comprising primarily hydrogen and carbon monoxide or to produce olefins, depending upon the reaction conditions. In accordance with another embodiment, the oxygen-containing gas on one side of the membrane is a gas containing steam, i.e. $H_2O$ gas. The $H_2O$ contacts the membrane resulting in reduction of the oxygen in the $H_2O$ to oxygen ions which are transported across the membrane to the opposite side where they react with methane or natural gas to produce a synthesis gas (primarily $H_2$ and CO) and the $H_2O$ on the first side of the membrane is reduced to hydrogen, which may be recovered and used for any number of purposes.

SUMMARY OF THE INVENTION

In our previously filed U.S. patent application Ser. No. 11/145,329, incorporated herein in its entirety by reference, we disclosed a dense, oxide ion conducting, cermet membrane that uses a steam sweep. The membrane is targeted at the production of pure, wet $H_2$ from coal- or biomass-derived gas and is also suitable for upgrading reformed natural gas. Under suitable $H_2$ and steam partial pressure gradients, those membranes conduct both oxide ions and electrons in what is termed "ambi-polar" or "mixed" conduction. The electrons mediate the reduction of steam to $H_2$ while the oxide ions oxidize $H_2$ in the synthesis gas to steam. The net effect is to produce pure, wet $H_2$ in the sweep gas. This concept has a potential overall advantage over other high-temperature membranes when operating in the high temperature environment of a coal/biomass-to-$H_2$ and/or electric power plant. Considerations of cost, stability, strength, flux, and system operation contribute to the potential overall advantage. However, the performance of this membrane requires a carefully engineered surface for facilitating the reduction of steam on the sweep side of the membrane.

It is, thus, one object of this invention to enhance the $H_2$-separation performance of our earlier membrane.

This objective is addressed by promoting the separation of $H_2$ from the gaseous mixture through the conducting of hydrogen atoms through the membrane as well as transporting electrons and oxide ions in opposite directions through the membrane. That is, the separation process of this invention employs a dense mixed oxide ion/electronic/hydrogen atom conducting membrane which produces molecular hydrogen on the sweep steam side of the membrane by direct hydrogen-atom transport while still operating by the ambi-polar mechanism. Thus, the membrane is able to retain the desirable cost, stability and strength features of our earlier cermet while producing a higher flux than it otherwise would produce.

More particularly, this objective is addressed by a method for separation of molecular hydrogen from a gaseous mixture containing the molecular hydrogen in which the feed side of a dense mixed oxide ion/electronic/hydrogen atom conducting separator is contacted with the gaseous mixture and at least a portion of the molecular hydrogen is converted to hydrogen atoms. The hydrogen atoms are transferred from the feed side of the separator through the separator to the permeate side of the separator disposed on the opposite side thereof from the feed side. The hydrogen atoms on the permeate side of the separator are then converted back to molecular hydrogen for storage or immediate use. In accordance with one embodiment of this invention, the permeate side of the separator is contacted with steam, forming water and/or steam on the first side of the separator and additional molecular hydrogen on the permeate side of the separator. With the addition of steam, the separator simultaneously functions as an oxide ion conductor, an electronic conductor, and a hydrogen atom conductor.

The dense mixed oxide ion/electronic/hydrogen atom conducting separator is a cermet membrane comprising at least one hydrogen atom conducting phase and at least one oxide ion conducting ceramic phase. The hydrogen atom conducting phase comprises a metal selected from the group consisting of Pd, Ni, Group IVB metals, Group VB metals and mixtures and alloys thereof and it is also electronically conductive. The oxide ion conducting phase comprises yttria-stabilized zirconia (YSZ), scandia-stabilized zirconia, ceria and/or other solid oxide electrolyte that has suitably high oxide-ion conductivity and that is stable in the presence of feed and sweep gases.

BRIEF DESCRIPTION OF THE DRAWINGS

The objects and features of this invention will be better understood from the following detailed description taken in conjunction with the drawings, wherein.

DETAILED DESCRIPTION OF THE PRESENTLY PREFERRED EMBODIMENTS

The terms "oxygen-consuming gas", "reactant gas" and "oxygen-containing gas" as used herein include materials which are not gases at temperatures below the temperature ranges of the method of this invention, and may include materials, such as the oxygen-containing gas steam, which is liquid at room temperature. As used herein, the term "dense" when used to describe the mixed oxide ion/electronic/hydrogen atom conducting membrane employed in the method of this invention refers to a membrane which is substantially non-porous. As used herein, the term "hydrogen atom transport" refers to the transport of any form of hydrogen atom that the hydrogen atom species may take.

The key component for carrying out the method of this invention is a cermet membrane or separator comprising an oxide ion conducting phase and a hydrogen atom conducting phase and having a feed side and an opposite permeate side. In accordance with one embodiment of this invention, the hydrogen atom conducting phase comprises at least one metal which is able to transport a high flux of hydrogen atoms through the membrane over a wide temperature range, about 500° C. to about 1400° C. The metal employed in the hydrogen atom conducting phase of the membrane in accordance with one preferred embodiment of this invention is selected from the group consisting of palladium (Pd), Group IVB metals of the Periodic Table, Group VB metals of the Periodic Table and mixtures and alloys thereof. At very high temperatures, nickel (Ni) may also develop a significant direct hydrogen atom flux.

The oxide ion conducting phase of the membrane in accordance with one embodiment of this invention is a ceramic phase comprising YSZ, scandia-stabilized zirconia, and/or ceria. In accordance with one preferred embodiment of this invention, the ceramic phase comprises 8-mole % yttria-stabilized zirconia (8YSZ), either alone, with some doped ceria, or substituted for completely by doped ceria. Other oxide ion conducting ceramics may also be employed.

The method in accordance with our earlier invention for the extraction or separation of hydrogen from a hydrogen-containing gaseous mixture, such as a synthesis gas produced by the gasification of solid hydrocarbon fuels, such as coal and biomass, comprises contacting the first side (oxygen-consuming gas side) of a mixed oxide ion/electronic conducting membrane with the synthesis gas, a gaseous mixture comprising hydrogen gas and carbon monoxide, and contacting the opposite side (oxygen-containing gas side) of the mixed oxide ion/electronic conducting membrane with steam, resulting in the formation of water and/or steam on the first side of the mixed oxide ion/electronic conducting membrane and hydrogen gas on the opposite side of the mixed oxide ion/electronic conducting membrane.

Figure 1:
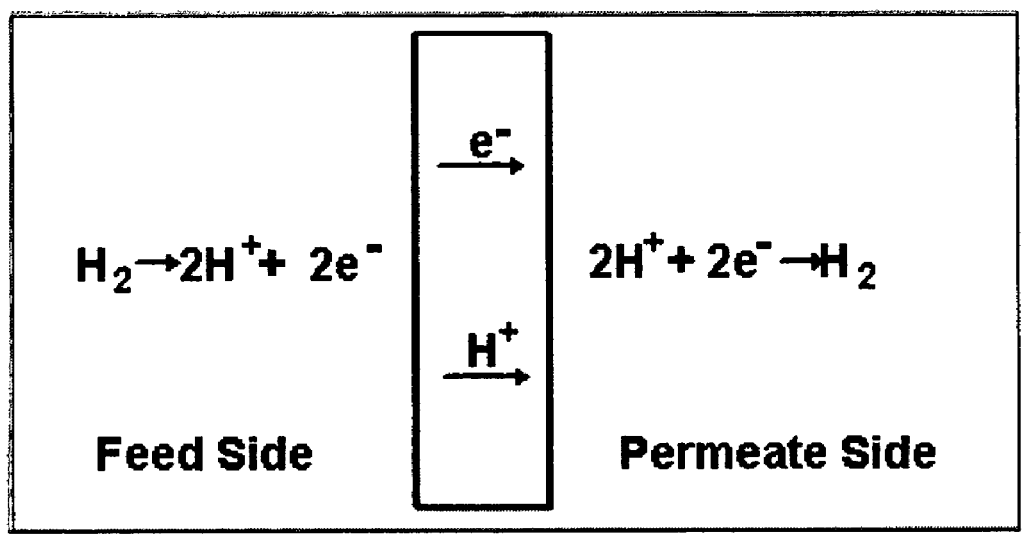
FIG. 1 is a schematic diagram showing the mechanism of hydrogen separation using a conventional mixed proton/electronic conducting membrane.
Figure 2:
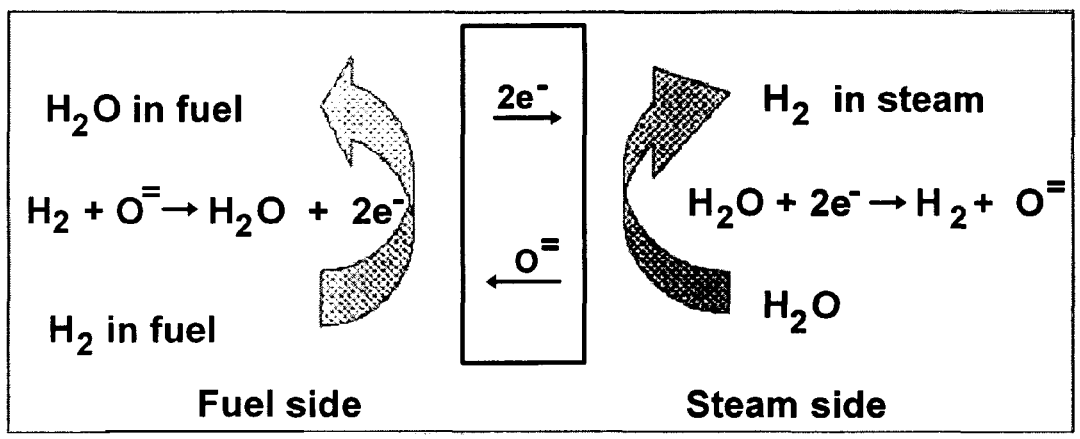
FIG. 2 is a schematic diagram showing the mechanism of hydrogen separation using a mixed oxide ion/electronic conducting membrane in accordance with the method disclosed in our earlier application.

The separation process of the method of our earlier invention is shown in FIG. 2. As shown therein, hydrogen, $H_2$, contacting the oxygen-consuming gas side of the membrane reacts with surface oxide to form water and electrons. The electrons are transported to the oxygen-containing gas side of the membrane where water in steam on the oxygen-containing gas side of the membrane dissociates into $H_2$ and oxide ion. The oxide ion is conducted back to the oxygen-consuming gas side of the membrane while the $H_2$ on the oxygen-containing gas side of the membrane is carried away by the sweeping steam. The net process of this invention is $$H_{2\,fuel} + H_2O_{steam} \rightarrow H_2O_{fuel} + H_{2\,steam}$$

the separation of $H_2$ from its initial gaseous environment into a simple process stream containing steam. The process may, therefore, be useful in separating $H_2$ from complex, high-temperature gas environments such as coal- or bio-gas. The method is equivalent to pressure driven $H_2$—depolarization of high temperature steam electrolysis, and the flux is, therefore, expressed as $$J_{H_2} = -\frac{RT}{4F^2L}\frac{(\sigma_{O^=})(\sigma_{el})}{(\sigma_{O^=}+\sigma_{el})}\left(\ln(p^f H_{H_2O})+\ln(p^S_{H_2})-\ln(p^f_{H_2})-\ln(p^S_{H_2O})\right)$$

with notations similar to those of the proton conductors previously described.

Figure 3:
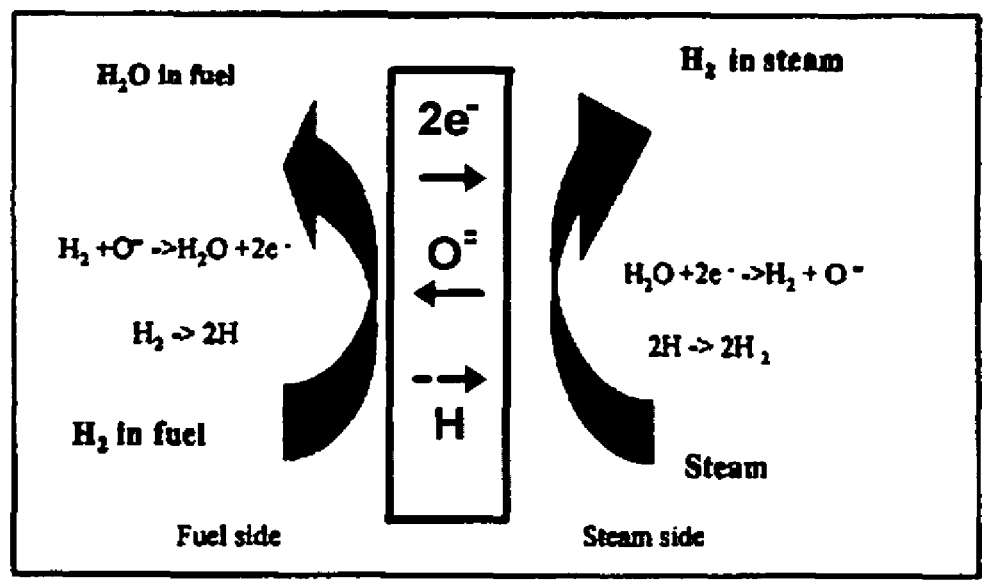
FIG. 3 is a schematic diagram showing the mechanism of hydrogen separation using a mixed oxide ion/electronic/hydrogen atom conducting membrane in accordance with the method of this invention.

FIG. 3 is a diagram showing the two mechanisms for hydrogen separation, i.e. the mixed conduction or ambi-polar mechanism and the hydrogen atom conducting mechanism. Similar to the ambi-polar mechanism shown in FIG. 2, fuel $H_2$ on the fuel side or feed side of the membrane reacts with $O^{2-}$ to form $H_2O$ and electrons. The electrons move to the sweep side, i.e. permeate side, of the membrane where they dissociate the steam into $H_2$ and $O^{2-}$ ions. The oxide ions are conducted back to the fuel side, and excess steam on the permeate side carries away the hydrogen produced on the permeate side. The result is the depletion hydrogen from the fuel side and its liberation in purified form into the sweep steam. The sweep steam can maintain a low total pressure difference across the membrane, improving structural integrity, while keeping the hydrogen partial pressure low.

The mechanism by which certain metals conduct hydrogen atoms involves dissociation of molecular hydrogen to hydrogen atoms on the feed side surface of the membrane, passing the hydrogen atoms through the membrane and forming molecular hydrogen on the permeate side surface of the membrane. In accordance with one preferred embodiment of this invention, the preferred metal for the hydrogen atom conducting phase of the membrane due to a combination of catalytic properties for the surface reactions, resistance to oxidation, stability towards embrittlement, and phase changes is a Pd alloy. There are, however, some disadvantages to using Pd alloys including cost, inter-diffusion with metallic supports, defect formation when fabricated as thin films, poor contaminant tolerance, and an inability to operate at temperatures greater than about 700° C. Accordingly, in accordance with one embodiment of this invention, lower cost metals selected from the group consisting of Group IVB and Group VB metals of the Periodic Table may be employed. For use at higher temperatures, in accordance with one embodiment of this invention, the preferred metal for the hydrogen atom conducting phase is nickel. Table 1 herein below gives the net reactions and driving forces for hydrogen transport by the two above-described mechanisms.

TABLE 1

| Membrane | Net Reaction | Driving Force |
| --- | --- | --- |
| Hydrogen-atom Conducting | $H_{2,fuel} \Rightarrow H_{2,steam}$ | $\Delta(P_{H_2})^{\frac{1}{2}}$ |
| Oxide Ion Conducting | $H_{2,fuel} + H_2O_{stream} \Rightarrow H_2O_{fuel} + H_{2,steam}$ | $\log\frac{P_{H_2,fuel} \cdot P_{H_2O,steam}}{P_{H_2,steam} \cdot P_{H_2O,fuel}}$ |

Figure 4:
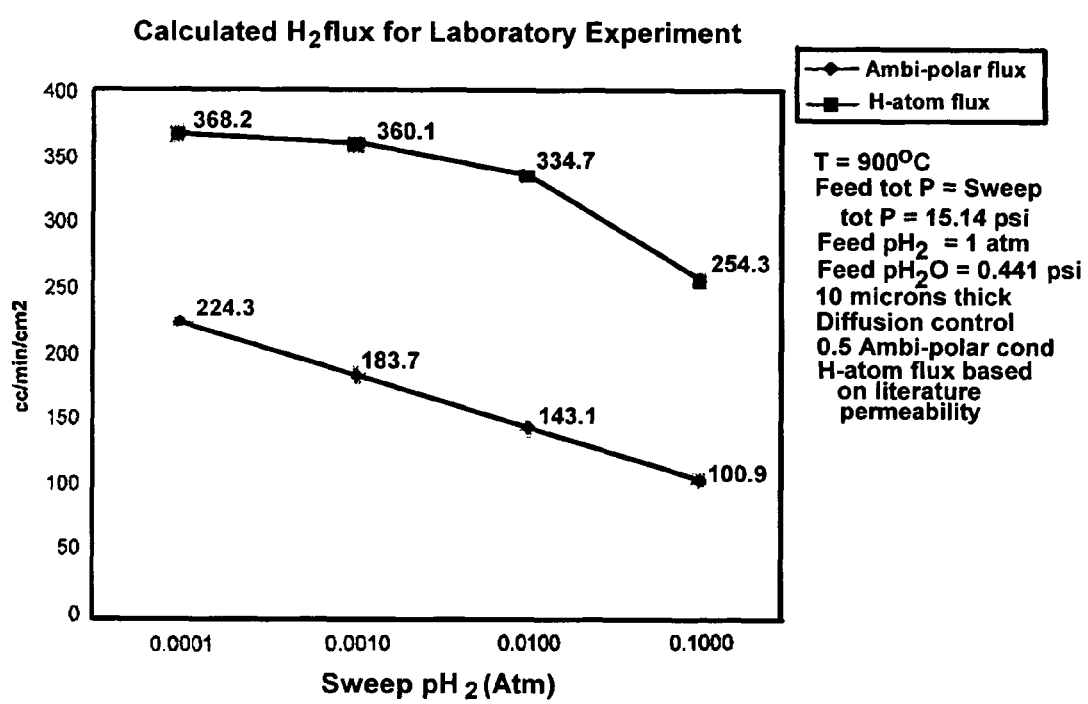
FIG. 4 is a diagram showing the predicted hydrogen flux contributions from the ambi-polar and hydrogen atom transport mechanisms employed in the method of this invention.

FIG. 4 predicts the fluxes involved in a Pd/YSZ membrane operating by these two mechanisms in a laboratory experiment conducted at 900° C. with pure molecular hydrogen feed gas and a concentrated steam sweep. The hydrogen-atom flux is for pure Pd and is calculated on the basis of literature permeability. The actual hydrogen-atom flux will depend upon the volume fraction of metal in the membrane. The ambi-polar flux is predicted on the bsais of the expected cermet electronic and ionic conductivities at 900° C. Neither mechanism is assumed to be limited by surface reactions.

FIG. 4 further includes other experimental conditions. The data clearly indicate that both transport mechanisms are able to contribute significantly to the overall flux.

In addition to composition, there are additional design considerations for membranes suitable for use in the method of this invention, for example fabricability and hydrogen separation flux. In accordance with one embodiment of this invention, the mixed oxide ion/electronic/hydrogen atom conducting membranes employed in the method of this invention are thin, supported membranes. Depending upon the speed of the reactions occurring at the surfaces of the membrane, thinner membranes result in higher hydrogen extraction fluxes. In accordance with one preferred embodiment of this invention, membrane thicknesses are preferably 20 microns or less. These thin membranes may be supported with a thicker porous substrate for handleability and strength. Preferably, although not required, the support is made of the same material as the membrane so that there is no thermal mismatch and chemical reactions occurring between layers. The support is porous to enable the reactant gases to reach the membrane surface.

Membrane geometry may be planar or tubular. There are, however, trade-offs between fabrication and sealing issues. Planar embodiments require a good seal while tubular embodiments are more costly to manufacture.

As previously indicated, one object of this invention is to provide a method for extracting hydrogen from solid hydrocarbon fuels using mixed oxide ion/electronic/hydrogen atom conducting membranes. Accordingly, the first step in accordance with one embodiment of the method of this invention is the gasification of a solid hydrocarbon fuel to produce a synthesis gas, which synthesis gas comprises hydrogen. The gasification step may be carried out by any of a number of gasification processes known to those skilled in the art. The synthesis gas, direct from the gasification reactor vessel employed in the gasification process, is brought into contact with the first side of a mixed oxide ion/electronic/hydrogen atom conducting membrane and steam is brought into contact with the opposite side of the membrane, resulting in the formation of hydrogen gas on the steam side of the membrane and hydrogen atoms and water and/or water vapor on the first side of the membrane.

In accordance with one preferred embodiment of this invention, the mixed oxide ion/electronic/hydrogen atom conducting membrane is disposed within the gasification reactor vessel in which the solid hydrocarbon fuel is being gasified. In this way, hydrogen is extracted from the synthesis gas as the synthesis gas is being produced. By making the hydrogen extraction process an integral part of the gasification process, the costs will be less than if the extraction process were carried out separate and apart from the gasification process.

In accordance with another preferred embodiment of this invention, the mixed oxide ion/electronic/hydrogen atom conducting membrane is disposed downstream of the gasification reactor vessel in another vessel that maintains temperature and pressure conditions close to those of the gasification reactor. In this way, the thermodynamic advantages for hydrogen extraction are retained under cleaner conditions than exist in the gasification reactor.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for separation of molecular hydrogen from a gaseous mixture containing said molecular hydrogen comprising the steps of:

providing a dense mixed oxide ion/electronic/hydrogen atom conducting separator having a feed side and a permeate side inside a gasification reactor;

providing said gaseous mixture to said feed side of said separator, said gaseous mixture comprising a synthesis gas produced by gasification of a solid fuel in the gasification reactor;

converting at least a portion of said molecular hydrogen to hydrogen atoms;

providing a plurality of oxide ions on said permeate side of said separator;

transferring said hydrogen atoms from said feed side through said separator to said permeate side of said separator and transferring said oxide ions from said permeate side through said separator to said feed side, generating electrons on said feed side for transfer to said permeate side;

transferring said electrons from said feed side through said separator to said permeate side; and converting said hydrogen atoms on said permeate side of said separator to molecular hydrogen.

2. A method in accordance with claim 1, wherein said gaseous mixture is at a temperature in a range of about 500° C. to about 1400° C.

3. A method in accordance with claim 1, wherein said dense mixed oxide ion/electronic/hydrogen atom conducting separator comprises at least one of a hydrogen oxidation promoter catalyst and a steam dissociation promoter catalyst.

4. A method in accordance with claim 1, wherein said solid fuel is selected from the group consisting of coal, biomass and mixtures thereof.

5. A method in accordance with claim 1 further comprising providing steam to said permeate side of said separator, forming at least one of water and steam on said feed side of said separator and said oxide ions and additional molecular hydrogen on said permeate side of said separator.

6. A method in accordance with claim 1, wherein said dense mixed oxide ion/electronic/hydrogen atom conducting separator is a cermet membrane comprising at least one hydrogen atom conducting metal phase and at least one oxide ion conducting ceramic phase.

7. A method in accordance with claim 6, wherein said at least one hydrogen atom conducting phase is a metal selected from the group consisting of Pd, Ni, Group IVB metals, Group VB metals and mixtures and alloys thereof.

8. A method in accordance with claim 6, wherein said at least one oxide ion conducting ceramic phase comprises at least one of YSZ and ceria.

9. A method in accordance with claim 8, wherein said at least one oxide ion conducting phase comprises 8YSZ.

* * * * *